United States Patent [19]
Harris

[11] Patent Number: 5,505,801
[45] Date of Patent: Apr. 9, 1996

[54] METHOD OF PRODUCING LAMINATED GRAPHICS-TO-GLASS COMPOSITE BACK-LIT PANELS

[76] Inventor: Gary L. Harris, 8128 Horizon Lake Dr., Las Vegas, Nev. 89128

[21] Appl. No.: 363,949

[22] Filed: Dec. 27, 1994

Related U.S. Application Data

[62] Division of Ser. No. 275,681, Jul. 15, 1994, Pat. No. 5,443,869.

[51] Int. Cl.⁶ .......................... B32B 31/04; B32B 31/10; B32B 31/12
[52] U.S. Cl. .......................... 156/100; 156/182; 156/235; 156/238; 156/240; 156/241; 156/249; 156/281; 156/289; 156/323
[58] Field of Search ............................. 156/99, 100, 235, 156/238, 182, 323, 324, 289, 240, 247, 249, 241, 281; 40/219, 564, 568, 569, 570; 428/13, 913.3

[56] References Cited

U.S. PATENT DOCUMENTS

| | | | |
|---|---|---|---|
| 3,533,897 | 10/1970 | Robbins, Jr. et al. | 428/430 |
| 3,768,186 | 10/1973 | Chase et al. | 40/624 |
| 4,060,441 | 11/1977 | Ohta et al. | 516/234 |
| 4,077,830 | 3/1978 | Fulwiler | 156/249 |
| 4,173,672 | 11/1979 | Mannheim | 428/203 |
| 4,197,151 | 4/1980 | Muzik | 156/249 |
| 4,230,768 | 10/1980 | Hamada et al. | 428/352 |
| 4,305,768 | 12/1981 | Lontz | 156/64 |
| 4,400,419 | 8/1983 | Laczynski | 428/40 |
| 4,528,233 | 7/1985 | Free | 428/205 |
| 4,728,386 | 3/1988 | Horvath | 156/361 |
| 4,739,568 | 4/1988 | Gearhart | 40/603 |
| 4,992,130 | 2/1991 | Vermeulen et al. | 156/307.5 |
| 5,010,672 | 4/1991 | Coleman | 40/615 |
| 5,254,447 | 10/1993 | Meyer et al. | 430/510 |

FOREIGN PATENT DOCUMENTS 2174233  10/1986  United Kingdom.

Primary Examiner—Michael W. Ball
Assistant Examiner—Francis J. Lorin
Attorney, Agent, or Firm—Philip D. Junkins

[57] ABSTRACT

A method of producing a composite laminated film-to-glass panel for the display by back lighting of graphics and/or advertising and instructional alpha-numerical information for incorporation in game machines, product dispensing apparatus, and wall displays. The composite film-to-glass panel of the invention is produced by assembling as a layered structure: a primary front glass sheet component; a first intermediate mounting sheet component of double-faced adhesive-coated clear polyester film material in interfacing relationship with the front glass sheet; a second intermediate component comprised of a sheet of positive image film bearing the graphic and/or advertising and instructional information on the front side thereof in interfacing relationship with the mounting sheet component; and a rear component comprising a film-protecting sheet of clear polyester film material bearing a clear laminating adhesive on its front side in interfacing relationship with the sheet of positive image film. Heat and pressure is applied to the layered assembly of components to adhesively bond the components of the structure to form the composite laminated film-to-glass panel of the invention. The clear laminating adhesive of the rear component includes an ultraviolet light screening material.

6 Claims, 2 Drawing Sheets

METHOD OF PRODUCING LAMINATED GRAPHICS-TO-GLASS COMPOSITE BACK-LIT PANELS

This is a division of my application Ser. No. 08/275,681, filed Jul. 15, 1994, now U.S. Pat. No. 5,443,869.

BACKGROUND OF THE INVENTION

1. Field of the Invention

The present invention relates to the back-lit display of graphic designs and advertising information. More particularly, the invention relates to display panels comprised of a primary layer of transparent sheet material upon which is affixed graphic designs and/or advertising or instructional information with such panels designed for back-lit presentation of such designs and information.

2. Description of the Prior Art

In recent years there has been an increasing utilization of back-lit display panels, particularly for decorative and informational use in connection with game machines, product dispensing apparatus, and for the wall display of colorful graphics and advertising materials. The principal means of satisfying such needs has been through display panels fabricated of rigid and semi-rigid transparent plastic sheet material to which graphic design matter and/or alpha-numerical advertising and instructional information has been applied by classic silk screen techniques. Silk screening procedures require careful color and image registration and matching and such procedures are labor intensive resulting in relatively expensive panel costs. Because of the difficulty in color-to-color registrations on plastic panel material, silk screened multi-color images and graphics often display fuzzy lines of color overlap or free-color space lines which are accentuated when the panel material is subjected to back-lighting.

There have also been longevity problems with graphics-bearing plastic panels used for game machines and product dispensing apparatus since such panels are frequently subjected to physical abuse by disgruntled game or dispenser operators and to environmental hazard through food and drink spills. Further, the plastic sheet material and inks applied by to the sheet material of such panels are subject to degradation over time by ultraviolet light rays originating from the commonly utilized fluorescent lamp type back-lighting illumination source.

It is an object of the present invention to provide improved back-lit panels for the display of graphic designs and/or advertising and instructional information.

It is a further object of the invention to provide improved laminated film-to-glass composite back-lit panels for the display of colorful graphics and/or alpha-numerical advertising and instructional information with sharp color-to-color registration.

It is still a further object of the invention to provide unique back-lit panels comprised of a primary layer of glass upon which is affixed positive photographic film displaying graphic designs and/or advertising and instructional information.

It is another object of the invention to provide improved back-lit panels for the display of graphics and/or advertising and instructional information comprised of a primary structural layer of glass sheet material upon which is adhesively affixed photographic film including positive graphic imagery and/or alpha-numerical information with such panels being resistive to ultraviolet degradation by long-term exposure to fluorescent back-lighting.

It is still another object of the invention to provide improved laminated film-to-glass composite back-lit panels for decorative and informational use in connection with game machines and product dispensing apparatus, and for the wall display of colorful graphics and advertising materials.

Other objects and advantages of the invention will be apparent from the following summary and detailed description of the invention, taken together with the accompanying drawing figures.

SUMMARY OF THE INVENTION

The present invention relates to unique and improved laminated film-to-glass composite back-lit panels for the display of graphics and/or advertising and instructional information. The panels of the invention are comprised of a primary layer or sheet of glass upon which is adhesively affixed (laminated) a secondary layer or web which includes positive photographic film bearing graphic imagery and/or alpha-numerical information. The secondary layer is itself a composite laminated web comprised of: a) an intermediate layer of the positive photographic film; b) a first outer layer of double-faced adhesive-coated optically clear polyester film material affixed by adhesive action to the image side of the photographic film; and c) a second outer layer of single-faced adhesive-coated clear ultraviolet screening plastic film material affixed by adhesive action to reverse side of the photographic film. The secondary layer, including the positive image photographic film, is adhesively affixed to the primary layer (glass sheet) after the glass has been thoroughly cleaned and freed of any and all dust particles on or embedded in the interfaced surface thereof.

To form the secondary layer of a laminated composite graphics panel of the invention, a web of positive image photographic film of highest quality and sensitivity is exposed to the projected imagery which it is desired to display by back-lighting. The film is appropriately developed, fixed and dried in a closed dust-free environment and immediately passed to a laminating station including a first pressure nip formed between two pressure rolls. Fed to such pressure nip, at the image side of the photographic film, is a web of double-faced adhesive-coated polyester film material from which has been removed a first adhesive protective release cover material on the adhesive side thereof which is to be interfaced with the photographic film through the pressure nip. The first release cover material is remove from the polyester film just prior to its entry into the pressure nip. Also fed to such pressure nip, at the back side of the photographic film, is a web of single-faced adhesive-coated ultraviolet screening plastic film material from which has been removed the adhesive protective release cover material on the adhesive side thereof which is to be interfaced with the photographic through the pressure nip. Again, the release cover material is removed from the UV screening film just prior to its entry into the pressure nip.

The secondary composite laminated layer or web (including the positive photographic film) leaving the first pressure nip has a second adhesive protective release cover material removed from the polyester film material and is fed into a second pressure nip formed between a set of two heated pressure rolls. Also fed into the second pressure nip for interfacing adhesion to the secondary layer is a primary layer or sheet of clean glass. The heat of the pressure rolls of the second pressure nip and the pressure applied to the interfaced glass sheet material and the film encompassing composite secondary layer by such rolls assures permanent adhesion of the secondary layer to the glass primary layer of the ultimate laminated film-to-glass composite panel of the invention.

BRIEF DESCRIPTION OF THE DRAWING FIGURES

Figure 1:
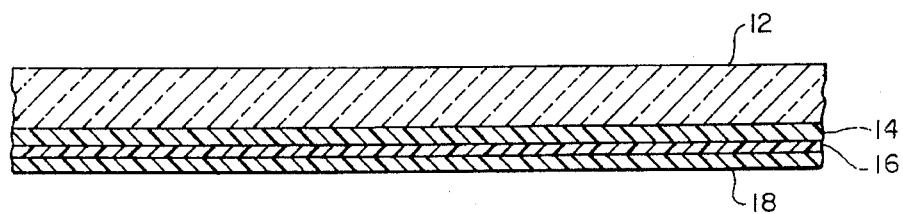
FIG. 1 is an enlarged cross-sectioned view of a composite laminated section of a film-to-glass back-lit panel in accordance with the present invention.
Figure 1A:
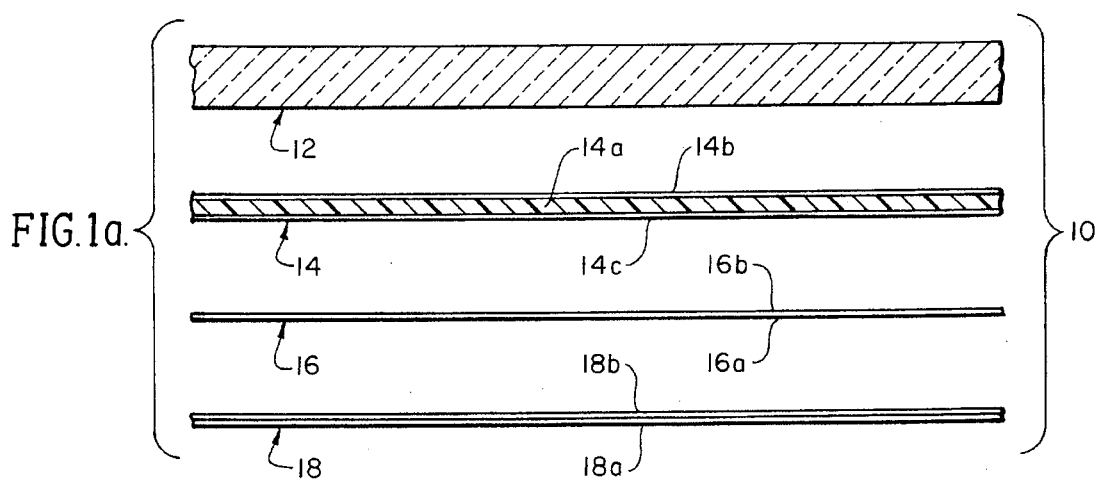
FIG. 1a is an exploded cross-sectioned view of the composite laminated panel section of FIG. 1 showing the adhesive surfaces of the components of the panel.
Figure 1B:
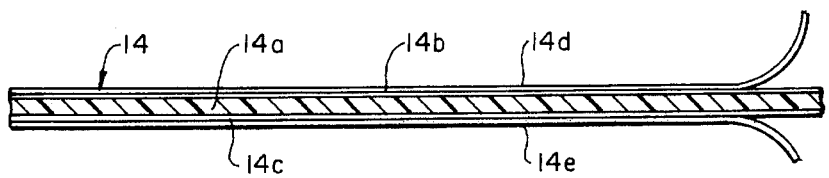
FIG. 1b is an enlarged cross-sectioned view of the double-faced adhesive-coated polyester film material used to affix the image side of the photographic film of the panel of FIG. 1 to the glass layer of the panel before removal of the release sheet of material initially covering and protecting the adhesive coatings of the polyester film material.
Figure 1C:
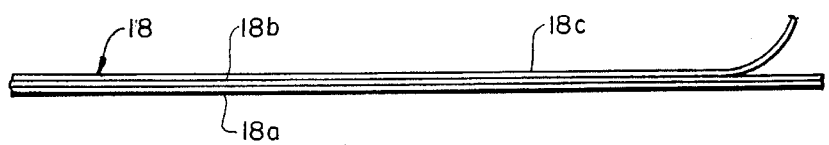
Figures 2, 3:
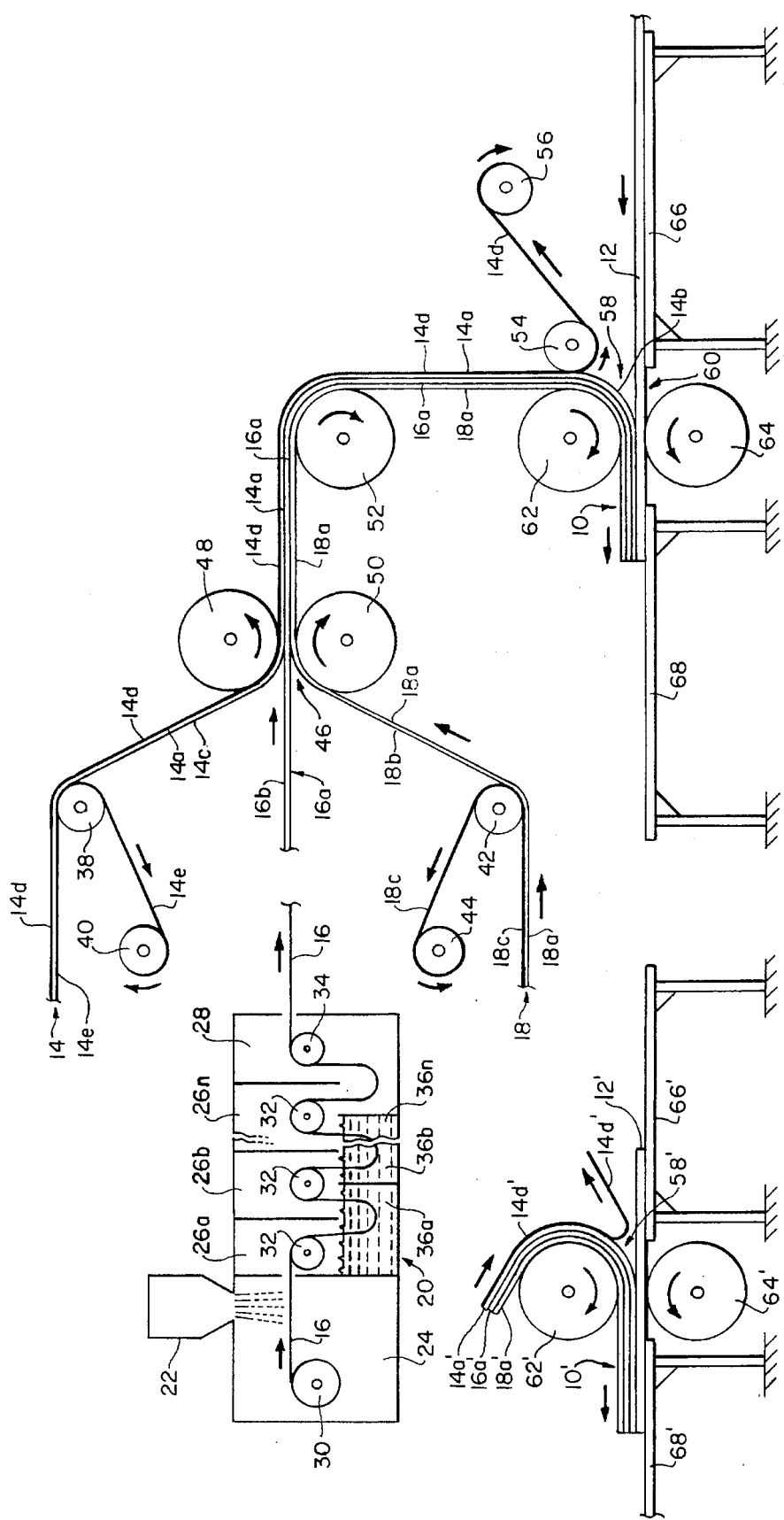

FIG. 1c is an enlarged cross-sectioned view of the single-faced adhesive-coated plastic film material affixed to the back side of the photographic film of the panel of FIG. 1 for the film-protective screening-out of ultraviolet light from the back-lighting source, such plastic film UV screening material being shown before removal of the release sheet material initially covering and protecting the adhesive coating of such screening material;

FIG. 2 is a somewhat diagrammatic showing of one method of fabricating in a continuous fashion the film-to-glass back-lit display panels of the present invention; and FIG. 3 is a somewhat diagrammatic showing of a second method of fabricating in panel-by-panel fashion the film-to-glass back-lit display panels of the invention.

DETAILED DESCRIPTION OF PREFERRED EMBODIMENTS OF THE INVENTION

Referring initially to FIGS. 1 and 1a of the drawing sheets, there is shown, first in enlarged cross-section and then in exploded cross-section, a film-to-glass composite laminated panel 10 which, in accordance with the present invention, is highly suited for the back-lit display of graphic designs and/or advertising and instructional information. The composite laminated panel 10 is comprised of a glass face sheet 12, a sheet of optically clear double-faced adhesive-coated polyester film material 14, photographic image-bearing film 16, and a sheet of single-faced adhesive-coated plastic film material 18 which protects the photographic film from degradation by screening out ultraviolet light rays which may be projected onto the rear side of the panel by a back-lighting source.

The FIG. 1a exploded cross-section view of the panel 10 of FIG. 1 shows in greater detail that the double-faced adhesive-coated polyester film layer 14 of the composite panel includes a sheet of polyester film material 14a which bears an adhesive coating 14b on the side thereof which adhesively interfaces with the glass face sheet 12. The polyester film layer 14 also bears an adhesive coating 14c on the side thereof which adhesively interfaces with the photographic film 16 comprised of film material 16a with its images imprinted on the image side 16b thereof. FIG. 1a also shows that the single-faced adhesive-coated UV screening plastic film material 18 is comprised of UV screening material 18a which bears an adhesive coating 18b on the side thereof which adhesively interfaces with the rear side of the photographic film material 16a.

FIG. 1b is an enlarged cross-sectioned view of the double-faced adhesive-coated polyester film material 14 prior to its application to the photographic film 16 and glass face sheet 12. As shown, the polyester film material per se 14a bears an adhesive coating 14b on the side of such film material that is to be adhesively interfaced with glass face sheet 12 and an adhesive coating 14c on the side thereof that is to be adhesively interfaced with the photographic film 16a. The adhesive coatings 14b and 14c on polyester film material 14a are initially protected, respectively, by sheets of removable adhesive release material 14d and 14e. The sheets of release material 14d and 14e may be of any of several known varieties including wax paper release sheeting material and silicone coated plastic release sheeting material.

FIG. 1c is an enlarged cross-sectioned view of the single-faced adhesive-coated plastic film material 18 prior to its application to the rear side of photographic film material 16a to provide UV screening protection to the photographic film and its imagery, As shown, the plastic UV screening material per se 18a bears an adhesive coating 18b on the side thereof that is to be adhesively interfaced with the photographic film material 16a. The adhesive coating 18b on screening material 18a is initially protected by a sheet of removable release material 18c. As in the case of the double-faced adhesive-coated polyester film material 14, the protective sheet of removable release material 18c may be of any of several known varieties.

Referring now to FIG. 2 of the drawing sheets, there is shown (in a somewhat diagrammatic form) a continuous method of fabricating the film-to-glass back-lit panels of the present invention. Positive photographic film 16 bearing graphic designs and/or advertising or instructional information is generated in film production station 20. The film production station 20 includes an image projection device 22 which applies the desired design and/or information imagery to unexposed film (from film spool 30) which moves through the film exposure section 24 of the station 20. Exposed film is developed, washed and fixed in an appropriate series of film developing and washing sections 26a, 26b ... 26n with the developed and fixed positive image film dried in a final film drying section 28 of film production station 20. During its travel through the film developing and washing sections of film production station 20 the film is moved from section to section in looping fashion over a multiplicity of film guide rolls 32 and a final guide roll 34 of the film drying section 28. Within the developing and washing sections 26a, 26b ... 26n the film in sequence is downwardly looped for passage through developing and washing baths 36a, 36b ... 36n. The strip or web 16 of processed positive image-bearing film leaving the film production station 20 is comprised of the film material 16a with the image side of the film indicated as 16b.

The film strip 16 is next fed to a pressure nip 46 formed between pressure rolls 48 and 50 wherein the film strip 16 is sandwiched between: a) a mounting strip or web of the double-faced adhesive-coated polyester film material 14 used to affix the image side 16b of the photographic film 16a to the glass layer of the back-lit panel structure of the invention; and b) a strip or web of the single-faced adhesive-coated UV screening plastic film material 18 to be affixed to the back side of the photographic film 16a. The double-faced adhesive-coated polyester film material 14, as derived from its supply roll (not shown), bears on each of its sides overlay release sheet material 14d and 14e to protect the adhesive coatings. As the mounting web of polyester film material 14 passes over guide roll 38 on its way to the pressure nip 46 its release sheet material 14e (covering the adhesive coating 14c to be interfaced with image side 16b of the photographic film 16a) is removed and wound onto overlay collection roll 40. The single-faced adhesive-coated UV screening plastic film material 18, as derived from its supply roll (not shown), bears on its adhesive coated side overlay release sheet material 18c to protect the adhesive coating 18b of the material 18a per se. As the web of UV screening film material 18 passes over guide roll 42 on its way to the pressure nip 46 the release sheet material 18c (covering the adhesive coating 18b to be interfaced with non-image side of the photographic film 16a) is removed and wound onto overlay collection roll 44. As a result of passage through the pressure nip 46, the mounting web 14, intermediate photographic film strip 16, and web of UV screening film material 18 are formed into a composite laminated strip or web of material 14a-16a-18a with the 14a polyester mounting material bearing on its outer surface adhesive coating 14b protected by overlay release sheet material 14d.

The composite laminated web of material 14a-16a-18a moves over guide roll 52 to a panel assembly station 60 wherein such web is fed to a pressure nip 58 formed between heated pressure rolls 62 and 64. Prior to entering the pressure nip 58 the composite laminated web 14a-16a-18a passes between guide roll 54 and pressure roll 62 and the protective overlay release sheet material 14d is removed from the adhesive coating 14b of the mounting web 14a and wound onto overlay collection roll 56. The composite laminated web 14a-16a-18a is interfaced with a sheet of glass 12 (supported by and moved along glass feed table 66) with the exposed adhesive coating 14b pressed into adhering relationship to the glass as the interfaced web and glass sheet enter and pass through the pressure nip 58 formed between pressure rolls 62 and 64. The completely fabricated composite laminated film-to-glass panel 10 of the invention thereafter is moved to a laminate receiving table 68 by the forward driving action of the pressure rolls 62 and 64. Distinct graphic and/or informational sections of the completed composite panel 10 may be appropriately separated from one-another by known glass cutter means.

As an alternative to the back-lit panel fabrication method shown in FIG. 2, and described hereinbefore, distinct composite laminated film-to-glass back-lit panels, in accordance with the present invention, may be fabricated in independent sections as shown in FIG. 3. Thus, distinct sections of the composite laminated web material 14a'-16a'-18a' (including an intermediate layer of positive photographic film 16a') of specific length and width dimensions may be interfaced with a glass sheet 12' (of matching length and width dimensions) and run through a pressure nip 58' formed between heated pressure rolls 62' and 64'. The composite laminated web material 14a'-16a'-18a' (with the overlay of release material 14d' protecting the adhesive coating on the mounting web 14a') is laid over pressure roll 62' with the leading edge of such composite laminated web material matched to the leading edge of glass sheet 12' (supported on glass feed table 66'). The release material 14d' is slightly pulled back so that the leading edge of the adhesive coating on mounting web 14a' is exposed and interfaced with the edge of the glass sheet. When proper alignment of the composite laminated web material 14a'-16a'-18a' with the glass sheet is attained the web material and glass sheet are introduced to the pressure nip 58' and as the web material and glass sheet are pulled through the pressure nip by the rolls 62' and 64' the release material is pulled off of the web material and discarded. The completely fabricated composite laminated film-to-glass panel 10' of the invention, after its passage between pressure rolls 62' and 64' is moved to a laminate receiving table 68'. To assure adequate web-to-glass adherence, the composite laminated panel 10' may be run through the pressure nip 58' a second or third time.

EXAMPLE

A broad selection of laminated film-to-glass composite back-lit panels for the display of graphics and/or advertising and instructional information have been fabricated in accordance with the present invention. For example, a most suitable composite graphics panel for back-lit use in game machines has consisted of: a panel face sheet of glass of 3/16 inch thickness, a film mounting sheet of "FLEXmark" brand double-faced adhesive-coated polyester film material supplied by FLEXcon, a sheet of "ILFOCHROME" positive-image color photographic display film manufactured by Ilford, and a rear polyester sheet of single-faced adhesive-coated "Filmolux" brand overlaminate ultraviolet screening material supplied by Interlam, Inc.

The film mounting sheet of double-faced adhesive-coated polyester film, intermediate sheet of positive image-bearing photographic display film, and single-faced adhesive-coated UV screening overlaminate were first laminated, in accordance with the invention, by passage of these materials together through a pressure nip comprised of mating pressure rolls. The adhesive coatings of the mounting polyester film and UV screening overlaminate, prior to their interfacing lamination to the photographic display film, were freed of their respective protective release liners of silicone coated polyester film. The solvent based acrylic adhesive of the polyester overlaminate layer included as the UV screening additive 2,2',4,4'-Tetrahydroxybenzophenone to provide, by the overlaminate, protection of the photographic display film from any harmful UV radiation from the panel's back-lighting source when the panel is in place on the face structure of a game machine.

Following the lamination of the mounting polyester film, intermediate photographic display and UV screening overlaminate, the resulting three-part composite was laminated under pressure and mild heat (approximately 47 degrees C or 120 degrees F) to the face sheet of glass of comparative size to form the completed back-lit panel. Prior to final lamination of the three-part composite to the sheet of glass the glass was thoroughly cleaned with an ammonia based glass cleaner, such as "Windex" cleaner produced by 8C Johnson, and freed of any and all dust particles on or embedded in the interfaced surface thereof. Also, prior to final lamination, the adhesive coating on the glass interfacing side of the three-part composite was freed of its protective release liner.

In the specification and drawing figures there has been set forth preferred embodiments of the invention and although specific terms have been employed, they are used in a generic and descriptive sense only and not for the purpose of limitation, the scope of the invention being defined in the following claims.

What is claimed is:

1. A method of producing a composite laminated film-to-glass panel for the display by back-lighting of graphic designs and/or advertising and instructional alpha-numerical information for incorporation in game machines, product dispensing apparatus and wall displays which comprises:

a) assembling as a composite pre-laminated rear layered component of said panel: i) a mounting sheet of optically transparent plastic film material bearing a clear laminating adhesive material on the front and rear surfaces thereof, said adhesive material on said front surface of said mounting sheet being protected by a sheet of release material; ii) an intermediate sheet of positive image film bearing said graphic designs and/or alpha-numerical information, the image side of said positive image film being interfaced with the laminating adhesive on the rear surface of said mounting sheet; and iii) a film-protecting sheet of optically transparent plastic film material bearing on its front surface a clear laminating adhesive including ultraviolet light screening material, the rear side of said sheet of positive image film being interfaced with the clear laminating adhesive on the front surface of said film-protecting sheet;

b) applying pressure to the assembly of said mounting sheet, intermediate sheet of positive image film, and film-protecting sheet to adhesively bond said sheets to one-another and form the composite pre-laminated rear layered component of said panel;

c) removing the sheet of adhesive protecting release material from the front adhesive surface of said mounting sheet of said composite rear layered component and interfacing said layered component at the adhesive surface of said mounting sheet with a sheet of glass comprising the front face component of said panel; and d) applying pressure and heat to the interfaced composite pre-laminated rear layered component and the glass front face component to adhesively bond said face component to said rear layered component to form said composite laminated film-to-glass panel.

2. The method of producing a composite laminated film-to-glass panel as claimed in claim 1 wherein the plastic film material of said mounting sheet and the plastic film material of said film-protecting sheet are polyester film materials.

3. The method of producing a composite laminated film-to-glass panel as claimed in claim 1 wherein the sheet of glass comprising the front component of said panel is thoroughly cleaned with an ammonia based glass cleaner and freed of all dust particles on, or embedded in, the surface thereof to be interfaced with and adhered to the composite pre-laminated rear layered component of said panel.

4. The method of producing a composite laminated film-to-glass panel as claimed in claim 1 wherein pressure and heat are applied to the interfaced composite pre-laminated rear layered component and the glass front component to adhesively bond said face component to said rear layered component by passing said interfaced rear layered component and said glass component between opposed heated rollers.

5. The method of producing a composite laminated film-to-glass panel as claimed in claim 4 wherein the opposed heated rollers are heated to a temperature of approximately 47 degrees C (120 degrees F).

6. A method of producing a composite laminated film-to-glass panel for the display by back-lighting of graphic designs and/or advertising and instructional alpha-numerical information for incorporation in game machines, product dispensing apparatus and wall displays which comprises:

a) assembling as a layered composite structure:
   i) a sheet of glass comprising the front face component of said panel;
   ii) a mounting sheet of optically transparent plastic film material comprising the first intermediate component of said panel and bearing a clear laminating adhesive material on the front and rear surfaces thereof, the front surface of said mounting sheet and its laminating adhesive being interfaced with said sheet of glass;
   iii) a sheet of positive image film bearing on its front side said graphic designs and/or alpha-numerical information comprising the second intermediate component of said panel, the front side of said positive image film being interfaced with the laminating adhesive on the rear surface of said mounting sheet; and
   iv) a film-protecting sheet of optically transparent plastic film material comprising the rear component of said panel and bearing on its front surface a clear laminating adhesive which includes an ultraviolet light screening material, the front surface of said film-protecting sheet and its laminating adhesive being interfaced with the rear side of said positive image film; and b) applying pressure and heat to said layered composite structure to adhesively bond the components of said structure to form said composite laminated film-to-glass panel.

\* \* \* \* \*